US011542675B2

(12) United States Patent
Lundbäck

(10) Patent No.: US 11,542,675 B2
(45) Date of Patent: Jan. 3, 2023

(54) SKIMMING AND SEPARATION DEVICE—CENTRAL ROTATING FLOW

(71) Applicant: Surfcleaner AB, Vaxholm (SE)

(72) Inventor: Stig Lundbäck, Vaxholm (SE)

(73) Assignee: Surfcleaner AB, Vaxholm (SE)

( * ) Notice: Subject to any disclaimer, the term of this patent is extended or adjusted under 35 U.S.C. 154(b) by 491 days.

(21) Appl. No.: 16/315,302

(22) PCT Filed: May 23, 2017

(86) PCT No.: PCT/SE2017/050551

§ 371 (c)(1),
(2) Date: Jan. 4, 2019

(87) PCT Pub. No.: WO2018/009116

PCT Pub. Date: Jan. 11, 2018

(65) Prior Publication Data

US 2021/0164184 A1 Jun. 3, 2021

(30) Foreign Application Priority Data

Jul. 6, 2016 (SE) .................................... 1650985-3

(51) Int. Cl.
*E02B 15/10* (2006.01)
*E02B 15/04* (2006.01)

(52) U.S. Cl.
CPC .......... *E02B 15/106* (2013.01); *E02B 15/045* (2013.01); *E02B 15/107* (2013.01); *E02B 15/108* (2013.01)

(58) Field of Classification Search
CPC .... E02B 15/045; E02B 15/106; E02B 15/107; E02B 15/108

(Continued)

(56) References Cited

U.S. PATENT DOCUMENTS 3,753,496 A 8/1973 Boyd
3,853,768 A 12/1974 Bagnulo
(Continued)

FOREIGN PATENT DOCUMENTS

CN 201162210 12/2008
CN 104853826 A 8/2015
(Continued)

OTHER PUBLICATIONS

English Translation of Second Office Action dated Dec. 10, 2020 for related Chinese Application No. 201780054768.9.
(Continued)

*Primary Examiner* — Christopher Upton
(74) *Attorney, Agent, or Firm* — Renner, Otto, Boisselle & Sklar, LLP

(57) ABSTRACT

A skimming and separation device comprising an outer casing (1) provided with constructions to directly or indirectly fasten all parts, defining a compartment (2), and a floater (3) configured to create the skimming function of the device, the floater is attached at its lower side to an essentially vertically arranged bellow (4) allowing the floater to adapt flow into a substantially circus volume and allowing the floater to move from an upper position with essentially no flow into the compartment (2) to a lower position allowing flow of water and debris follow the contours of the floater (3) in a downward direction into the device. A power device (8) is provided and includes a propeller to achieve in-flow and outflow of the device. The device further comprises a central tube (c) arranged along a vertical center axis of the compartment and configured to receive said flow of water and debris, and at least one central rotation member being structured to generate a downward directed and central rotating flow of said water and debris within said central tube (c).

13 Claims, 7 Drawing Sheets

26
pl
wl
5
vfl
2
c
8
sn
CF
dw
vu
cw
sf
sC
tw
9

(58) Field of Classification Search
USPC ... 210/170.05, 170.09, 170.11, 242.3, 747.6, 210/776, 923, DIG. 5
See application file for complete search history.

(56) References Cited

U.S. PATENT DOCUMENTS

| | | | | |
|---|---|---|---|---|
| 4,067,811 | A | 1/1978 | Dallamore | |
| 4,111,809 | A | 9/1978 | Pichon | |
| 5,023,002 | A * | 6/1991 | Schweizer | E02B 15/045 210/923 |
| 5,124,038 | A | 6/1992 | Sekino | |
| 6,120,681 | A | 9/2000 | Heo | |
| 6,274,046 | B1 * | 8/2001 | Lundback | E02B 15/106 210/242.3 |
| 6,458,282 | B1 | 10/2002 | Lundback | |
| 6,743,358 | B1 | 6/2004 | Lundback | |
| 7,807,059 | B2 | 10/2010 | Lundback et al. | |
| 8,017,011 | B2 * | 9/2011 | Ellis | B01D 39/1623 210/DIG. 5 |
| 10,883,240 | B2 * | 1/2021 | Lundbäck | E02B 15/106 |
| 2016/0053455 | A1 | 2/2016 | Lundback | |

FOREIGN PATENT DOCUMENTS

| | | | |
|---|---|---|---|
| DE | 43 36 963 | A1 | 7/1994 |
| FR | 2 219 672 | A5 | 9/1974 |
| JP | H06-339645 | A | 12/1994 |
| JP | 2000-303438 | A | 10/2000 |
| RU | 2 484 204 | C1 | 6/2013 |
| SE | 514 756 | C2 | 4/2001 |
| WO | 97/07292 | | 2/1997 |
| WO | 99/22078 | | 5/1999 |
| WO | 2014/168577 | A1 | 10/2014 |
| WO | 2017/095302 | A1 | 6/2017 |

OTHER PUBLICATIONS

English Translation of Search Report dated Dec. 10, 2020 for related Chinese Application No. 201780054768.9.

International Search Report for corresponding Patent Application No. PCT/SE2017/050551 dated Aug. 25, 2017.

International Preliminary Report on Patentability for corresponding Patent Application No. PCT/SE2017/050551 dated Jan. 17, 2019.

* cited by examiner

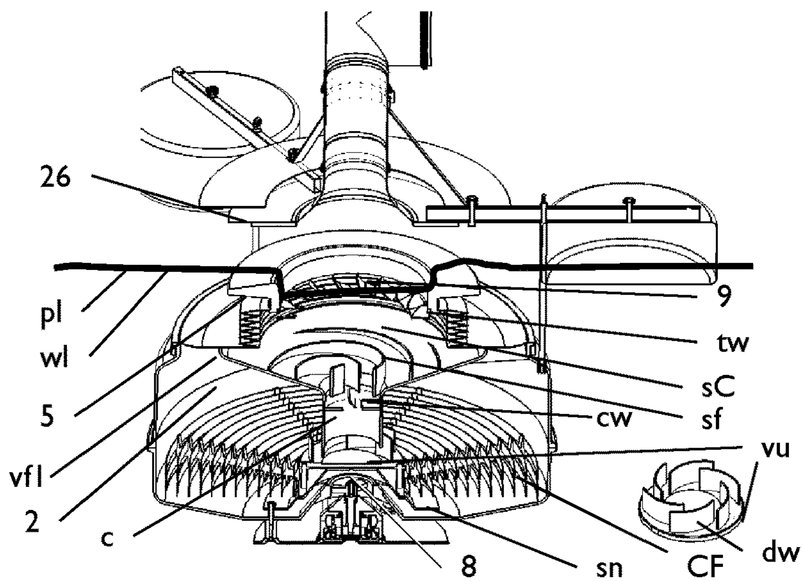
Fig. 4a
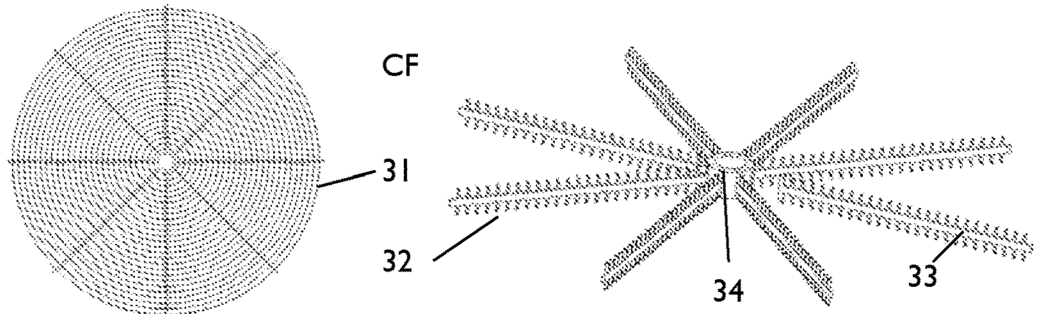
Fig. 4b
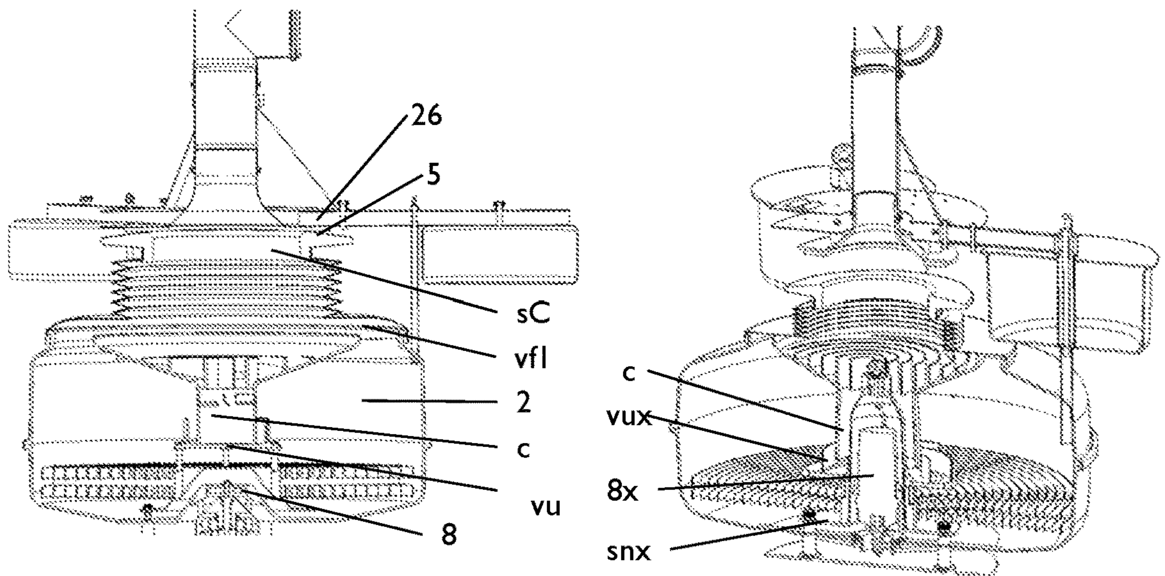
Fig. 4c
Fig. 4d

SKIMMING AND SEPARATION DEVICE—CENTRAL ROTATING FLOW

FIELD OF THE INVENTION

The present disclosure relates to a skimming and separation device according to the preamble of the independent claim.

BACKGROUND OF THE INVENTION

Herein is disclosed a skimming and separation device for collecting material floating on the surface, that may be applied for collecting different kinds of pollutants, like solids, weeds foam, algae, and oils, floating on the water. The technique applied by the device is basically based upon gravimetric separating methods which mean that pollutants having a lower density than water will float up on to the top of the water level. The speed of the flotation is not only depending on differences in density forces but also to a large extent depending of the structures, shapes, and areas etc. of the pollutants.

There are many examples of skimming and separating devices that are described as suitable for collecting oil spilled on a water surface, including oil mixed with solid material.

The flotation is not only depending on differences in density forces but also to a large extent depending of the structures, shapes, and areas etc. of the pollutants.

There are many examples of skimming and separating devices that are described as suitable for collecting oil spilled on a water surface, including oil mixed with debris.

In WO-97/07292 and WO-99/22078 various examples of prior art system are disclosed. Furthermore, U.S. Pat. Nos. 6,743,358, 7,807,059 and WO-2014/168577 disclose systems and devices related to the skimming and separation device to be disclosed in the present application (see e.g. FIG. 1).

These known systems and apparatuses comprise a collection vessel provided with a side wall comprising an upper wall part, a floater, which has some buoyancy. The floater is attached at its lower side to an essentially vertically arranged bellow allowing the floater to move from an upper position where no flow may enter the apparatus to a lower position forming a skimming weir allowing flow of water and debris to follow the contours of the floater and hit an open circular water compartment, the skimming compartment, with a water level that is determined by the speed of a propeller, the floating forces of the floater and the force gradients acting on the bellow in relation to the water level in the skimming compartment.

In one known device disclosed in U.S. Pat. No. 6,743,358 the circular skimming water compartment is at its upper end in open contact with atmospheric pressure and at its lower end delimited by a wall that holds the inlet of the collection vessel from the skimming compartment.

In WO-2014/168577 is disclosed a skimming and separation device provided with angulated nozzles (see FIG. 2), arranged to achieve a flow from the skimming compartment to the closed separating and collecting compartment. The angulated nozzles make the fluid including the pollutants to obtain a slow horizontal rotating motion within the separation and discharge compartment. The slow rotation of the fluid in the separation and discharge compartment makes a large horizontal area with no streamers that can jeopardize the homogenous vertical speed in the compartment provided by the discharge means (propeller) at the bottom of the separation compartment. Thus, the discharge of fluid in the bottom of the separation compartment will generate a vertically oriented speed. This speed may be adjusted to be lower than the speed that the gravitational separation forces are generated to bring the pollutants towards the discharge volume and area of the separating and collecting compartment.

The separation and collecting compartment is delimited upward by a top wall with a valve and discharge opening through which the oil and other pollutants may be expelled, by an equal exchange of water and/or pollutants entering into the separating and collecting compartment.

Water can be fed into the closed separating and collecting compartment through the collection vessel open to the skimming compartment and return to the sea through an opening in the bottom wall of the collection vessel, where a motor and propeller are arranged.

The collected debris is discharged from the collection compartment of the devices in the referred patents and patent applications by reversing the propeller and feeding water into the separating and collection compartment. This leads to a backflow through the collecting vessels causing the floater of skimming weir to be pressed against an overlying plate leading to a closure and pressure increase in the skimming and collecting compartment. This will further result in a pressure increase in the separating and collection compartment resulting in that collected oil in the collecting compartment will be pressurized and be expelled through the valve and discharge opening into a suitable recipient (see FIG. 1). The generated rotation of water and pollutants described in WO-2014/168577 is advantageous in many aspects. However, in some situations solid objects of various kinds are carried along by e.g. oil and foam, and might start clogging in the discharge volume while waiting for the discharge phase.

Basically, the skimming and separation flow patterns through the device can be described as following two main basic flow patterns down into the separating and collecting compartment.

The first basic flow pattern is disclosed in FIG. 1 as a central vertical flow (cvF) technology platform with known embodiments. According to this flow pattern a flow of concentrated pollutants from the concentrating compartment is provided downward along a central vertical path to the separating and collecting compartment where baffle arrangements are used to reduce flow streamers that can disturb the separating phase.

The second basic flow pattern is disclosed in FIG. 2 as a peripheral vertical flow (pvF) technology platform. According to this flow pattern a flow of concentrated pollutants from the concentrating compartment is provided down to the separating and collecting compartment in a peripheral location of the compartment. This may be achieved e.g. by a plurality of vertical peripheral tubing and where these tubing are provided with angular outflow openings to generate a slow horizontal rotational motion in a horizontal plane to reduce flow streamers that can disturb the separating phase.

Common for both these basic flow patterns (cvF) and (pvF) is that by reversing the flow (by reversing the rotational direction of the propeller) through the separator and storage compartment an over pressure is created and a flow is generated such that collected pollutants are forced out from the compartment to suitable external storage containers.

Devices with central vertical flow (cvF) pattern have an internal storage compartment and during the emptying phase, by means of the applied over pressure, a valve on the top of the storage compartment is opened allowing the stored pollutant to flow into the skimming concentrating compartment to be further pressurized through an outflow tract that is formed by the hydraulically closed skimming wear and the outflow tract in the top lid of the skimming and separator device. In order to increase the pressure on to the collected pollutants in the separating and collecting compartment, a valve function is closing off a returning flow through the central transporting tub during the emptying phase (see FIG. 1).

Devices with the peripheral vertical flow (pvF) pattern have all the time during its ongoing skimming and separating functions, a direct communication to the outflow tract of the skimming and separating apparatus that during the collecting phase is closed to the atmospheric pressure by a valve (vf3) (see FIG. 2). During the emptying phase with reversed flow through the propeller, the whole compartment of the separator will be pressurized due to the hydraulic closing of the skimming wear which means that the outflow valve will be open for transportation of collected pollutants to a suitable storage tank.

In all the referred devices, solid pollutants such as e.g. bottle caps, pieces of plastic, pieces of bark and wood, leaves or other plant debris are as well as liquid pollutants allowed to enter into the main separating and collecting compartment. Pollutants with irregular shapes and large areas etc. will gain such a hard resistance in its flotation towards the surface area that they need a very long time to enter on to the discharge zone which means that the vertical operated speed in the separating and collecting compartment has to be very low, resulting in an overall low capacity of the device. Furthermore, these kind of pollutants does not coalescent on filters instead they rather clog them. In addition, they have a tendency to aggregate into fabric like masses during their storage in the collecting compartment.

In other occasions floating debris can carry heavier debris like e.g. sand that during the skimming and or separating phase separates and thus will sediment on to the horizontal arranged baffles and on to the bottom of the separator that can result in uneven flow distributions and malfunctions of the separator.

Furthermore, in some occasions the intermittent discharging phases applied in e.g. the system of WO-2014/168577 may influence the transportation of pollutants from the separator to a suitable collecting tank. In addition, intermittent discharging phases are time consuming and may lower the overall capacity of the skimming and separation device.

Thus, the general object of the present invention is to achieve an improved skimming and separation device that eliminates, or at least mitigates, the above stated drawbacks. The present invention is in particular related to achieve an improved skimming and separation device of the earlier known central vertical flow platform by transforming it into a new central rotating, vertical and horizontal flow platform (crvhF) and further into a new centrifugal collecting flow pattern (ccF).

SUMMARY OF THE INVENTION

At least the above-mentioned objects are achieved by the present invention according to the independent claim. Preferred embodiments are set forth by the dependent claims.

The skimming and separation device according to the present invention is directed to provide new constructions related to the earlier known central vertical flow platform (cvF) by transforming it into a new central rotating, vertical and horizontal flow platform (crvhF) and further into a new centrifugal collecting flow pattern (ccF), in order to generate new embodiments that stepwise, in right orders, without disturbing each other functions, optimize the conditions for effective gravimetric and centrifugal purification and transportation of liquids and/or solids floating on a water level to e.g. a storage tank or storage bag.

By applying the skimming and separation device a number of purifying steps and different kinds of arrangements may be achieved to optimize the separating and emptying process to the pollutants that are going to be separated, locally harvested and stored in an external storage tank or e.g. a floating storage bag.

This is a short, non-exhaustive, list of purifying steps that is accomplished by the embodiments disclosed herein 1. To remove rough solid floating pollutants in a rough separation step.
2. To generate rotating forces to facilitate transportation and aggregation of pollutants inside the separator.
3. To prevent that larger floating debris does not enter into the main separating compartment.
4. To create a slow horizontal rotating flow that all over its area can be used to generate an even vertical flow during the separating period, e.g. controlled by the rotational speed of a propeller.
5. To remove solid pollutants with irregular shapes and large thin areas such as leaves thin plastic sheets etc.
6. To create optimal functions for non-clogging coalescent filters.
7. To optimize the gravimetric and centrifugal separation to such an extent that e.g. activated carbon filters may be used to further improve the water quality.
8. To create an emptying and transportation process that may be a part of a closed or open loop between the separator and its external storage tanks/floating bag in relation to its surrounding water.

According to one aspect of the present invention a skimming and separation device is defined, that applies the new central rotating, vertical and horizontal flow platform (crvhF) defined to include at least one peripheral flow deflecting member arranged essentially below an inner periphery of the floater and/or into or out of the vertical tube, or on to the inlet valve arrangement, structured to achieve at least horizontal rotational flow and forces of water and debris in main separating compartment of the separator.

According to another embodiment, a valve unit (vu) is provided with deflection wings configured to transform a vertical or rotating flow in the central tube into a slow horizontal rotating flow in the main separating compartment and is further structured to prevent backflow through the central tube during the emptying phase of the device.

The improved skimming and separation device is less time-consuming to use, has a higher capacity, and has the capability of an improved handling of especially solid pollutants with irregular shapes and large areas, such as e.g. bottle caps, pieces of plastic, pieces of bark and wood, leaves or other plant debris. In addition, this improved device is suitable to collect liquid pollutants, floating solid debris, proteins in a mixture of combinations.

SHORT DESCRIPTION OF THE APPENDED DRAWINGS

FIGS. 1*a*-1*c* illustrates cross-sectional views of a known skimming and separation device, working according to the central vertical flow technology platform (cvF).

FIGS. 4a-4d illustrates various views of embodiments of the skimming and separation device according to the present invention, working according to the new central rotation vertical and horizontal flow platform (crvhF) and the new centrifugal collecting flow (ccf) platform.

DETAILED DESCRIPTION OF PREFERRED EMBODIMENTS OF THE INVENTION

The skimming and separation device will now be described in detail with references to the appended figures. Throughout the figures the same, or similar, items have the same reference signs. Moreover, the items and the figures are not necessarily to scale, emphasis instead being placed upon illustrating the principles of the invention.

In order to fully appreciate the present invention in relation to the known prior art devices, these will be described with references to FIGS. 1-3.

Figure 1A:
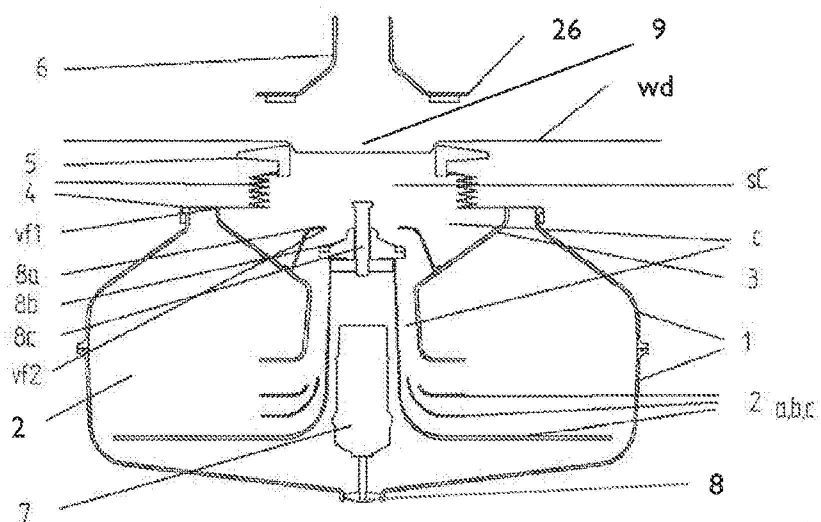

Thus, FIGS. 1a and b illustrate a known skimming and separation device being in a collecting phase and working in accordance to the basic central vertical flow pattern (cvF). The device comprises an outer assembled casing 1 provided with constructions to which parts are directly or indirectly attached, including floaters (not shown). The outer casing 1 defines an external wall of a compartment 2 that is used for separation and accumulation of debris.

Figure 1B:
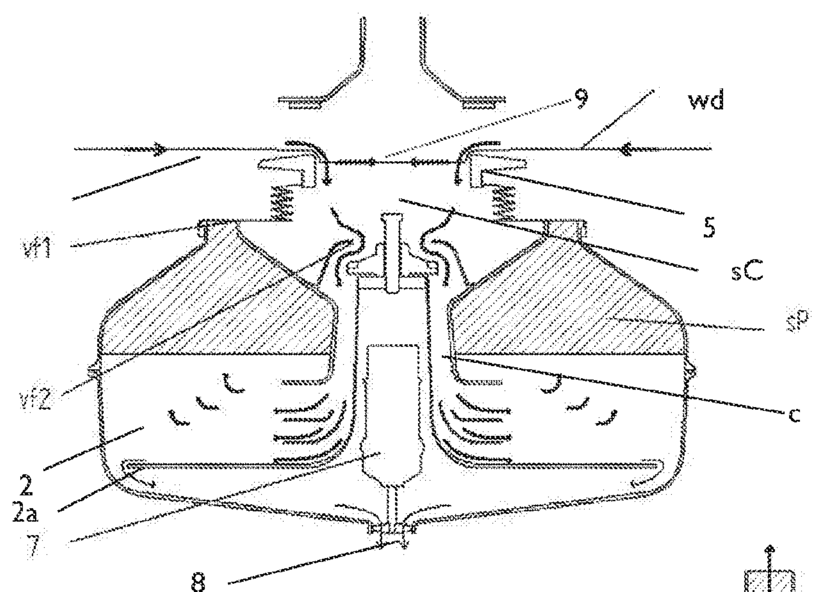

A floater 5 is provided being configured to create the skimming weir of the device. The floater is attached at its lower side to an essentially vertically arranged bellow 4 with a flat part towards the casing 1 allowing the floater to move from a neutral position (not shown) in which position essentially no flow will enter into the device, to a lower position which is illustrated in FIGS. 1a and 1b. In this position, a flow of water and debris (wd) will follow the contours of the floater 5 and flow downwards to the water level 9 in the skimming compartment (sC). The water level 9 is determined by the speed of the propeller 8, the floating forces of the floater 5 and by the force gradients acting on the bellow 4 in relation to the water level 9 in the skimming compartment (sC) and the outside water level (wd).

The layer of pollutants will during the collecting phase (see FIGS. 1a and 1b), by sliding over the skimming edge, gain energy and generate radial forces that will compress and increase the thickness of the pollutant layer on top of the surface layer 9 in the skimming compartment (sC). The flow of water through the water level 9 in the skimming compartment (sC) generate turbulences that forms drops of e.g. oil and/or foam that with an appropriate flow rate will after passing the valve function (vf2) be transported through the central tube (c) into the separation and collecting compartment 2 that during the collecting phase is closed to the atmospheric pressure by the valve function (vf1) generated by the flat area of the bellow 4.

After passing the valve function (vf2), which prevents back flow during the ejection phase (illustrated in FIG. 1c), the flow of water and pollutions will enter the compartment 2 through the vertical center tube (c). The flow will, by the function of several baffles 2a, 2b, 2c arranged to reduce stream lines, and then display a horizontally expanding flow pattern that rapidly decreases the horizontal flow rate allowing the pollutants to diverge on to the top of the closed compartment 2. The flow of purified water will pass the peripheral edge of the large baffle 2a (see arrow in FIG. 1b) and further out of the compartment 2 by means of the propeller 8 driven by the motor 7.

Figure 1C:
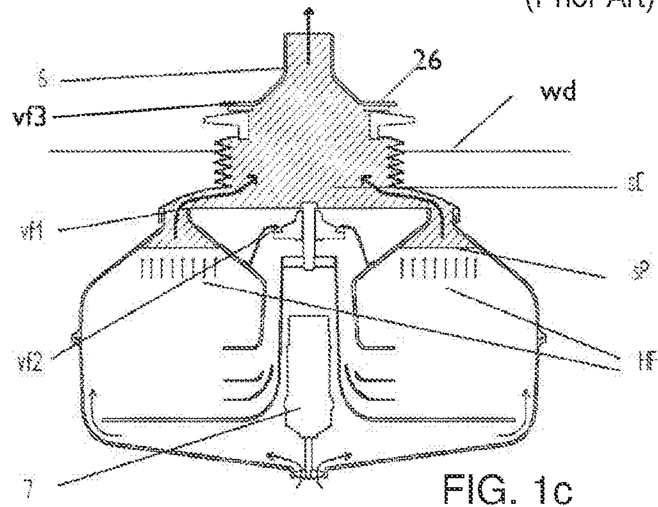

FIG. 1c illustrates the device being in an emptying phase. The propeller 8 is now rotating in the other direction filling the compartment 2 with water and thus increasing the pressure to become higher than the atmospheric pressure. The valve vf2 will close and the valve vf1 will open. The floating forces of the floater 5 and the force gradients acting on the bellow 4 in relation to the water level (wd) and the water level 9 in the skimming compartment (sC) will now generate forces that will push the floater towards the lid 26 and create a third valve function (vf3) to direct the collected pollutants through the skimming compartment (sC) into an output tube 6 for further transportations to a storage compartment (not shown).

Figure 2A:
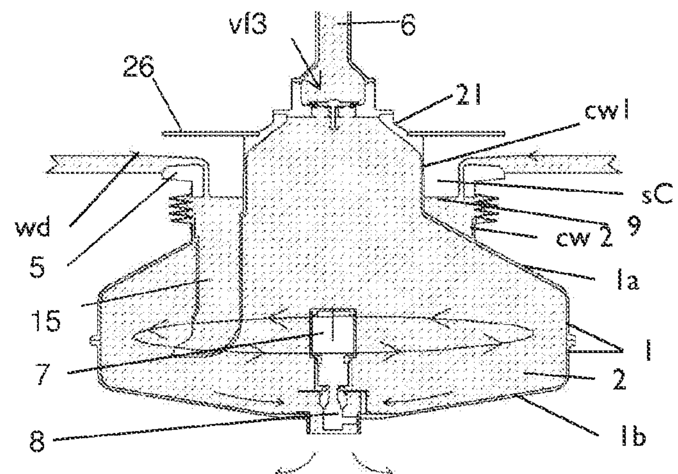
FIGS. 2a-2c illustrates various views of a known skimming and separation device, working according to the peripheral vertical flow technology platform (pvF).
Figure 2B:
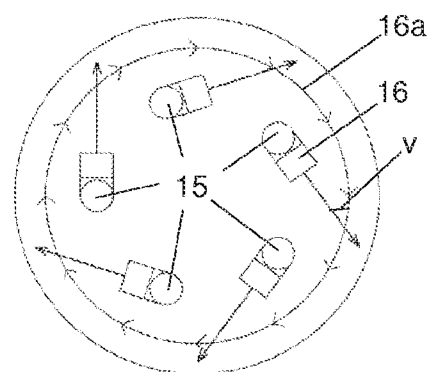

FIGS. 2a and 2b illustrates a known skimming and separation device being in a collecting phase and working in accordance to the basic peripheral vertical flow pattern (pvF).

In general, the skimming and separation device consists of an outer casing 1 that makes it possible to directly or indirectly fasten all the other parts.

In FIG. 2a is illustrated an outer casing 1 that is an external wall of a closed compartment 2 used for separation and collection of debris. The casing 1 is provided with a number of tubes 15 entering into the closed compartment 2, which is divided into at least two parts, an upper casing part 1a and a lower casing part 1b. A floater 5 with a bellow 4, without a flat part as described in FIG. 1, is attached to the upper casing part 1a via a circular wall (cw2). These structures surround the upper closed volume of the compartment 2 being a part of the internal storage volume above the angled ending of the tubes 15 of the device (see FIG. 2c) and define a toroid shaped skimming compartment (sC) around the circular wall (cw1) being a part of the upper casing part 1a.

Figure 2C:
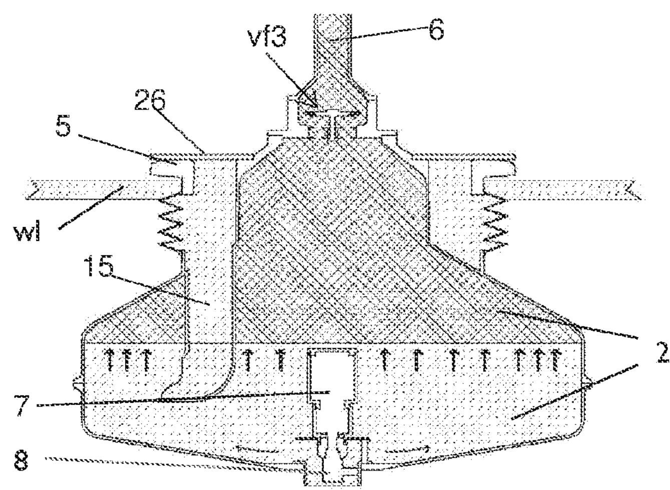

The outflow tract 21 of the compartment 2 is provided with a valve (vf3) that prevents backflow of pollutants and air entering into the compartment 2 during the collecting phase of the device illustrated in FIG. 2a, and opens during the discharge phase illustrated in FIG. 2c.

The floater is attached at its lower side to an essentially vertically arranged bellow 4 allowing the floater to move from a neutral position (not shown) in which position essentially no flow will enter into the device, to a lower position which is illustrated in FIG. 2a. In this position, the water level (wd) with water and debris will follow the contours of the floater 5 and flow downwards to the water level 9 in the skimming compartment (sC). The water level 9 is determined by the speed of the propeller 8, the floating forces of the floater 5 and by the force gradients acting on the bellow 4 in relation to the water level (wl) and the water level 9 in the skimming compartment (sC).

The layer of pollutants will during the collecting phase (see FIG. 2*a*), by sliding over the skimming edge, gain energy and generate radial forces that will compress and increase the thickness of the pollutant layer on top of the surface layer 9 in the skimming compartment (sC). The flow of water through the water level 9 in the skimming compartment (sC) will generate turbulences that, as being described in relation to the central vertical flow pattern (cvF, FIG. 1), forms drops of e.g. oil and/or foam that, with an appropriate flow rate, will generate, after passing the angled endings of the tubes 15, a slow spinning of the fluid inside the compartment 2.

The area of the skimming compartment (sC) is determined according to the decided flow through the separator device and also in dependence of the diameters of the tubes 15 such that they do not clog.

FIG. 2*b* discloses a cross-sectional view from above through the lower part of the separation device illustrated in FIG. 2*a* where the transportation tubes 15 comprise an angled lower tube part, a deflection unit 16 configured to direct the liquid flow of the tubes in an essentially horizontal outward direction inside the compartment 2 such that the direction of the liquid flow is in an oblique direction in relation to the external vertical wall of the casing 1. All deflection units 16, e.g. five, are arranged at essentially the same angle (v) in relation to the wall, e.g. in a direction that is in the range of 20-60 degrees to the separator wall, thereby the liquid flow from all tubes will together generate a rotational movement of water and pollutants illustrated by the arrows 16*a* within the separation compartment 2.

The angled tubes will generate a slow rotation of the water and pollutants in the closed compartment 2 that effectively reduce the risk of streamers and further result in that the whole area of the compartment 2 can be used to create an even vertical flow towards the outlet through the propeller 8 that is lower than the gravitational motions of the pollutants towards the closed compartment 2.

The vertical flow is set by the rotational speed of the propeller 8. If the densities of the pollutants are close to that of the water and/or the pollutants are solids of irregular shapes the vertical speed has to be set very low. This will to a large extent decrease the separating capacity of the device.

The angled tubes need some extra space both in diameter and height of the compartment 2 in order to generate the smooth vertical movement over the whole separating area of the compartment 2.

FIG. 2*c* discloses a discharge phase of the skimming and separation device according to the basic peripheral vertical flow pattern (pvF). A reversed rotation of the propeller 8 increases the pressure in the compartment 2 resulting in that the floater 5 will be forced towards the lid 26 and shut off backflow over the peripheral tubes 15 that further results in that the valve function (vf3) opens and flow of accumulated debris can be forced through the outlet 6 into a suitable storage tank (not shown).

Figure 3A:
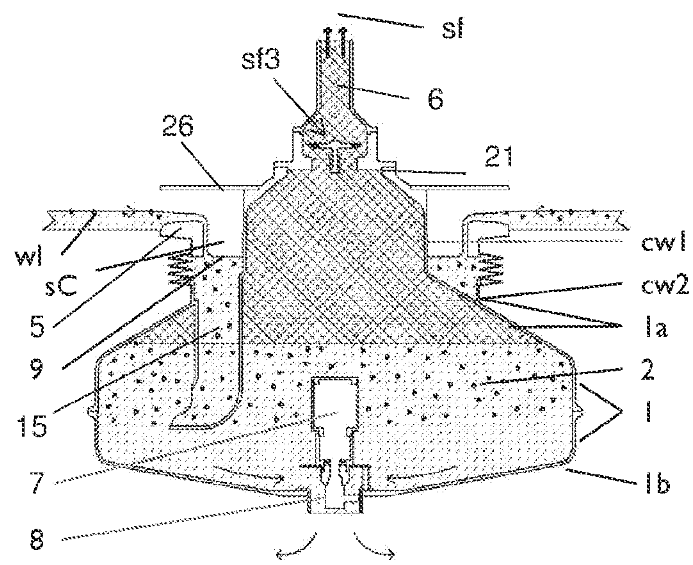
FIGS. 3a and 3b illustrate cross-sectional views of a known skimming and separation device, working according to the peripheral vertical flow technology platform (pvF).
Figure 3B:
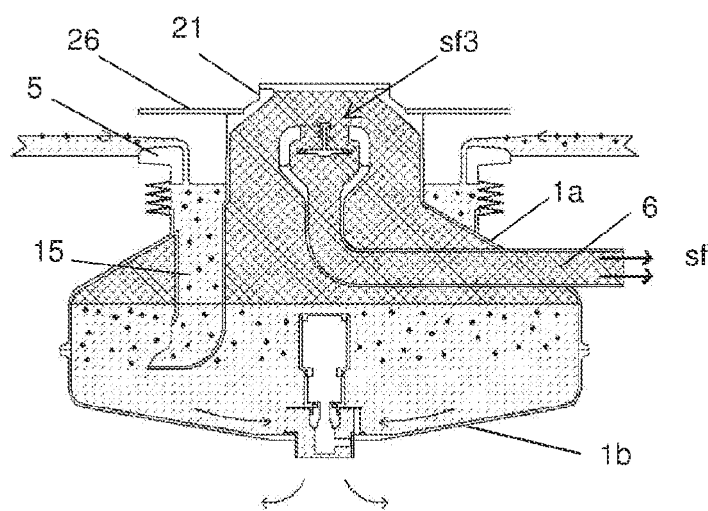

Furthermore, in FIGS. 3*a* and 3*b* is illustrated two known variations to create a continuous removal of collected debris in a skimming and separating device according to peripheral vertical flow pattern (pvF) by adding externally generated suction forces (sf) to the volume of the collected pollutants through the outlet 6. The externally generated suction forces will besides transportation of debris to a suitable vacuum tank also have impact onto the pressure inside the compartment 2 and thus also have impacts on the skimming and separating functions of the device. The reference signs of FIGS. 3*a* and 3*b* designate the same or similar items as in FIGS. 2*a*-2*c*.

By applying the concepts of the present invention adaptive separating steps are presented in order to optimize the conditions for effective gravimetric purification and accumulation of pollutants, with or without filtrations. An effective suitable transportation of collected pollutants, such as liquid, foam, algae and/or solids, to a storage tank or e.g. a floating storage bag (SB) are thereby achieved, which transportation is adapted to be a part of an open or closed loop to the surroundings.

This has been accomplished by:

1. Modifying the skimming and separation device that applies the known central vertical flow pattern (cvF) into a central rotating vertical and horizontal flow (crvhF) platform, that is embodied by different embodiments of the present invention.
2. Modifying the skimming and separation device that convert the known central vertical flow pattern (cvF) into a central rotating vertical and horizontal flow (crvhF) platform and a centrifugal collecting flow (ccF) platform, that is embodied by different embodiments of the present invention.

Various different embodiments of the present invention will be discussed in detail in the following. These embodiments disclose various aspects of the skimming and separation device where flow into, and out from, the separation device is such that the pollutants are subjected to pressure gradients either of the reversed liquid flow and/or of suction forces applied at the outflow tract of the separator.

The skimming and separation device structured to implement a central rotating vertical and horizontal platform (crvhF) and the centrifugal collecting flow platform (ccF), according to the present invention, will be disclosed in detail with references to FIGS. 4-7, that illustrate various embodiments.

However, firstly, the skimming and separation device according to the present invention, and some embodiments, will be generally described, thereafter a detailed description of the embodiments illustrated in the figures will follow.

Thus, a skimming and separation device is provided, comprising an outer casing 1 provided with constructions to directly or indirectly fasten all parts, defining an open compartment 2. A floater 5 is arranged configured to create the skimming function of the device, and the floater is attached at its lower side to an essentially vertically arranged bellow 4 allowing the floater to adapt flow into a substantially circum volume and allowing the floater to move from an upper position with essentially no flow into the compartment 2 to a lower position allowing flow of water and debris follow the contours of the floater 3 in a downward direction into the device. A power device 8 with a propeller 7 is arranged at a lower part of the device, wherein the power device is configured to be controlled by a control unit such that various kinds of flows and pressures may be generated to control the in-flow and outflow of the device.

The device further comprises a central tube (c) arranged along a vertical center axis of the compartment and configured to receive the flow of water and debris. At least one central rotation member is provided which is structured to generate a downward directed and central rotating flow of the water and debris within the central tube (c), see e.g. FIGS. 4*a*, 4*c*, 4*d*, 5*b*, 5*c*, 6*c*, 6*d* and 7*b*-7*d*.

Preferably, the at least one central rotation member comprises deflecting members, e.g. twisted wings (tw), arranged below and along the inner periphery of said floater. In another embodiment the at least one central rotation member comprises deflecting members, e.g. tilted wings (cw), provided within said vertical central tube (c).

Advantageously, the central tube (c) is at the lower end provided with a valve unit (vu), that is configured to perform its valve function to close the central tube (c) during an ejection phase of the device, wherein the valve unit (vu) may be provided with deflecting members, e.g. wings (dw), that with horizontal rotating flow and forces when water and debris are entering into the compartment 2, during a collecting phase of the device, thereby accomplishes the centrifugal collecting flow platform (ccF). The valve unit (vu) is illustrated e.g. in FIGS. 4*a*, 4*c*, 4*d*, 5*b*, 5*c*, 6*c*, 6*d* and 7*b*-7*d*. The valve unit (vu) without wings, may still, if the central vertically central tube (c) is provided with the tilted wings (cw), accomplish the centrifugal collecting flow platform (ccF).

In still another embodiment the device comprises an essentially planar and disc-shaped coalescent filter (CF) that is arranged in a horizontal plane in the lower part of the compartment 2, see e.g. FIGS. 4*a*-4*d*, 5*b* and 5*c*.

Figure 6A:
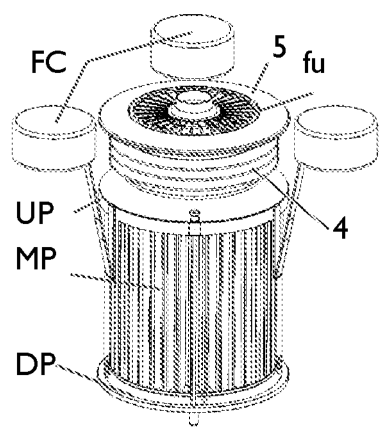
FIGS. 6a-6f illustrates various views of still further embodiments of the skimming and separation device according to the present invention, working according to the new central rotation vertical and horizontal flow (crvhF) platform but not necessarily to the (ccF) platform.

In another embodiment the device comprises an essentially planar and disc-shaped coalescent filter (CF) (FIG. 4*b*) that is arranged in a horizontal plane in the lower part of the compartment 2 (see e.g. FIGS. 4*a, b* and 5*a*-5*c*), that further, in e.g. FIG. 6*a,b*, is supplied with a thin net (not shown) to avoid that e.g. leaves and thin plastic sheets are getting stacked to the coalescent filter during the (ccF) collecting process.

Figure 5A:
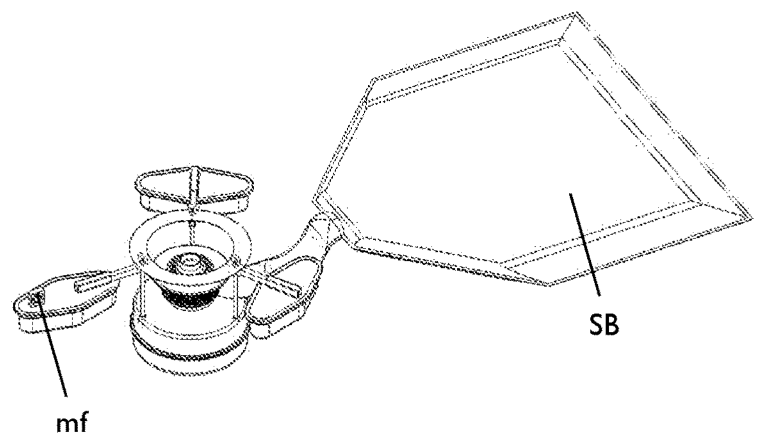
FIGS. 5a-5c illustrates various views of further embodiments of the skimming and separation device according to the present invention, working according to the new central rotation vertical and horizontal flow (crvhF) platform and the new centrifugal collecting flow (ccf) platform.
Figure 5B:
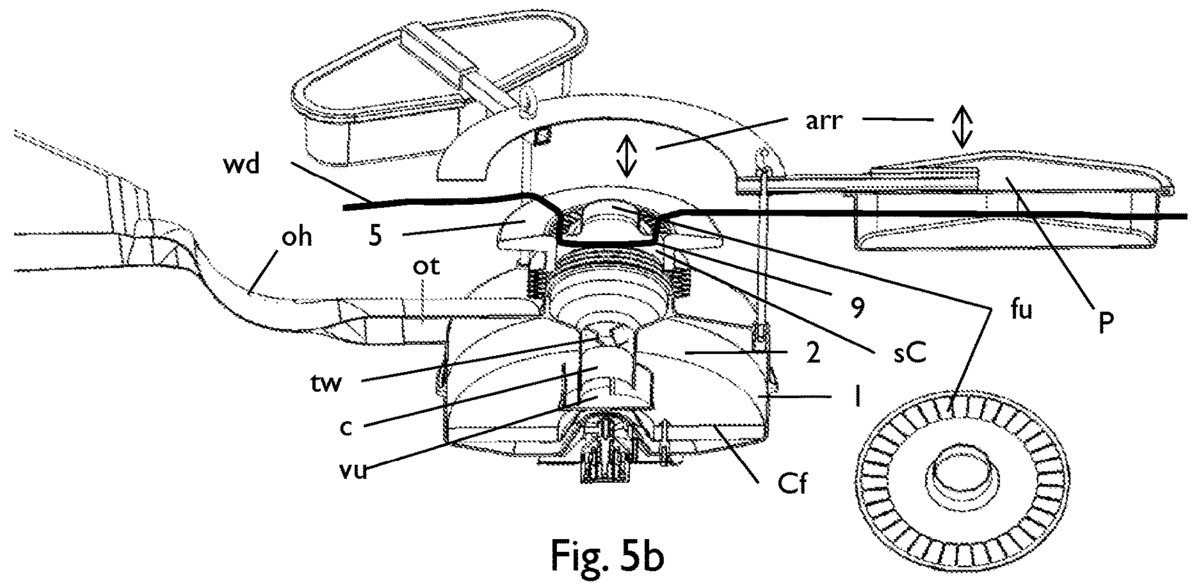

It has been generally been shown that with e.g. covering the lamellas on top of the coalescent filter (CF) in FIG. 4*b*, with a thin net (not shown), or being a part of the coalescent filter (Cf) in FIG. 5*b, c*, that the net will prevent thin pollutants like plastic sheets and leaves from stacking or passing through the coalescent filter. The horizontal rotating fluid above the coalescent arrangement not only creates an even vertical distribution of flow through the coalescent arrangement but also generates horizontal centrifugal forces that generate a centrifugal collecting flow pattern (ccF) with a tornado-like collecting effect. The pollutants just continue to rotate until they pass to the collecting volume of the compartment 2 or just keep on rotating if they have lower densities than water, until the collecting and separating compartments are ready for the emptying phase. This prevents that leaves, plastic sheets and other thin but large area pollutants do not reduce the flow of water and liquid pollutants like oil through the coalescent filter. The start of the emptying phase can be controlled by the resistant through the net and or the coalescent filter that in some embodiments just can serve as a support to the net if only solid debris like leaves, sheets of plastic are being collected. It has further been shown that when the generated horizontal rotating forces are acting closer to a suitable low resistant coalescent filter or a thin net, these forces become more effective to prevent clogging of the net and coalescent arrangement as mentioned above. However, oil drops coalescence against the lamellas, increase in size and finally as larger oil drops end up to the collecting volume of the compartment 2.

In one embodiment, the device comprises an upper part (UP), a middle separating and collecting part (MP) and a lower drive unit part (DP), (see FIGS. 6 and 7). These parts are structured to be assembled in such a way that the device has an essentially circular cylindrical shape, wherein the upper part (UP) is structured to provide for fixation of the bellow 4, and the floater 5. The middle part (MP) has the shape of a cylinder having a circular cross-section and comprises the vertical central tube (c) and an outer enclosure defining a separating and collecting compartment (d2) and that a vertically oriented filter unit (vF) is arranged within said compartment (d2). The filter unit (vF) has an overall hollow circular cylindrical shape where the central vertical tube (c) is arranged within and along a longitudinal axis of the filter unit. Preferably, the filter unit comprises a pleated filter.

The skimming and separation device preferably comprises a control unit that is configured to receive a measurement signal from the power device 8 indicating the power consumption of the power device, and if the power consumption is above a predetermined threshold the rotational speed of the propeller is varied and/or the rotational direction is altered according to preset control rules. The control rules comprise a rule including control instructions to continuously and repetitively increase and then decrease the rotational speed and to alter the rotational direction.

Now the various embodiments will be further discussed in relation to the figures.

FIG. 4*a* shows a cross-sectional view of the skimming and separation device according to the invention that illustrates an embodiment being in a collecting phase. During this phase, the rotation of the propeller 8 decreases the pressure in the compartment 2, which closes the valve unit (vf1) and opens up the valve unit (vu).

The water layer (wd) with pollutants will, during the collecting phase as being described in FIG. 1*a*, by sliding over the skimming weir, gain energy, and generate radial forces that will compress and increase in thickness of the pollutant layer on top of the surface layer 9 in the skimming compartment (sC). That will further be enhanced by the horizontal rotating flow and forces generate the deflection wings (tw).

According to this embodiment the skimming compartment (sC) is provided with a spiral filter (sf) that serves two purposes. Firstly, it comprises a first rough filter preventing larger solid pollutants to enter into the separating and collecting compartment 2, and secondly it will support the rotating motions to liquid in the skimming compartment (sC) generated by a central rotation member, herein embodied as tilted wings (tw) attached to the floater 5 and/or tilted wings (cw) provided in the vertical central tube (c).

The spinning in the skimming compartment (sC) and further in the vertical central tube (c) generates vortex formations that facilitate transportation of aggregated pollutants on the surface of the water level 9 in the skimming and concentrating compartment (sC) to the separating compartment 2. The vortex formation is allowed to pass through a central hole in the spiral ruff filter (sf). That will facilitate transportation of aggregated pollutants from the surface area 9 in the skimming and concentrating compartment (sC) to the main separating compartment 2 without tearing these aggregations apart which improves the speed of the gravimetric and centrifugal separation in the main separating compartment 2. The central tube (c) is at the lower end provided with a valve unit (vu). The valve unit (vu) is configured to perform its valve function to close the central tube (c) during the ejection phase. The valve unit (vu) can also be provided with wings (dw) that will force passing water and pollutions entering into the separation and collecting compartment 2 to continue into slow rotating motions that in a very efficient way will prevent streamlines. The slow horizontal spiral spinning motion results in that the whole area of the compartment 2, can be used to create an even vertical flow towards the outlet through the propeller 8. The spiral spinning motions and the low vertical flow rate that is set by the rotational speed of the propeller is also very suitable for passing a coalescent filter (CF) and finally, an optionally provided with an activated carbon filter. The coalescent filter is essentially planar and disc-shaped and is arranged in a horizontal plane in the lower part of the compartment 2.

FIG. 4*b* is a top view illustrating an example of a non-clogging guiding unit embodied by the coalescence filter (CF). Coalescence is the process by which two or more droplets, bubbles, or particles merge during contact to form a single daughter droplet, bubble or particle. The filter comprises thin lamellas 31 attached to hooks 32 sitting on spokes 33 that in turn is fixated to a central hub 34. The lamellas 31 both ensure that coalition can be achieved and that decided sizes of non-floating solid debris can pass through the filter. They can be winded in a counter direction to the rotational direction of the central rotational flow. The object is to create turbulences that facilitate remaining small droplets of oil to coalescence against the lamellas, increase in size and finally as larger oil drops end up to the collecting volume of the compartment 2.

In applications where leaves, plastic stripes or other pollutants which are large in area but thin in volume, an extra thin net can be placed on top of the coalescence filter (CF) or being a part of coalescence filter (Cf) in FIG. 5*b,c* to avoid that these kinds of pollutants do not stack to the coalition filter during the collecting phase when the centrifugal collecting flow pattern (ccF) (the tornado effect) described above is taking place.

FIG. 4*c* is a cross-sectional view of the skimming and separation device illustrating an embodiment of the device during the ejection phase. A reversed rotation of the propeller 8 increases the pressure in the compartment 2, which closes the valve unit (vu) and opens up the valve function (vf1). The accumulated pollutants are then forced to enter into the skimming compartment (sC) resulting in that the floater 5 will be forced towards the lid 26 and thereby provide a sealed outflow tract for pressurized transportation of pollutants into a suitable storage tank (not shown).

Finally, according to the illustrated device a nozzle (sn) is provided that at high flow may be applied to clean the bottom from e.g. sand. The nozzle (sn), as well as the spokes 33, may prevent that vortex formations are generated by the rotation of the propeller 8.

FIG. 4*d* is a perspective view of the skimming and separation device provided with a larger motor 8*x* covered with a larger suction nozzle (snx) and a larger valve unit (vux) with a center hole to slide over the suction nozzle in order to perform the same functions as being described above in relation to FIGS. 4*a*-4*c*.

Figure 5C:
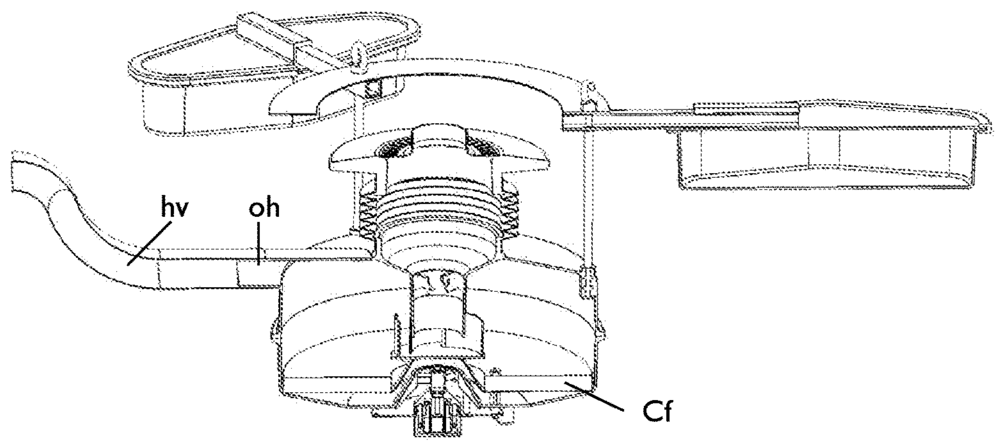

FIGS. 5*a*-5*c* illustrates various aspects of an embodiment of the skimming and separation device according to the invention.

This embodiment is especially suitable to be used for cleaning oil polluted water surface areas with low amount of floating solid debris.

FIG. 5*a* is a perspective view of the skimming and separation device provided with a floating storage bag (SB). It also provided with a maneuvering fan (mf) that can turn the whole separator around its central vertical axis. The motor outlet is provided with a baffle (not shown) that can direct the outlet flow from the propeller (8) FIG. 4*c* in a certain direction and force the separator to move in the opposite direction. The maneuvering fans (mf) can turn the separator with low energy consumption and thereby make the separator to follow e.g. GPS-signals handled by the control unit (not shown) to clean decided areas. The whole separator is also very suitable to be powered by solar panels.

FIG. 5*b* disclose a cross-sectional perspective view of the embodiment being in the collecting phase where the adaptive progressive separating steps are essentially the same as being described in relation to FIGS. 4*a*-4*d*.

Water and pollutants (wd) will, as described in relation to FIGS. 4*a*-4*d*, be skimmed over the floater 5 into the skimming compartment (sC). To prevent that larger floating solids, like e.g. sea weeds, will enter the skimming compartment (sC), an inlet filter unit (fu) is provided and structured to be placed onto the floater 5.

The layer of pollutants, which in this example is oil, will during the collecting phase as described in relation to FIGS. 1*a* and 4*a*, by sliding over the skimming edge, gain energy and generate radial forces that will compress and increase the thickness of the oil layer on top of the surface layer 9 in the skimming compartment (sC). That will further be enhanced when the floater is provided with deflecting units (tw) as being described with references to FIG. 4*a*.

The spiral filter (sf) in the skimming compartment (sC) described in FIG. 4*a* may in this embodiment be avoided, as the filtration now is performed by the inlet filter unit (fu).

The central rotation member provided with twisted wings (tw) inside the vertical central tube (c) will create rotating motions of water and debris in the skimming compartment as well as in the vertical central tube (c). Thereby vortexes are generated that will facilitate transportation of aggregated pollutants on top of the water level 9 in the skimming compartment (sC) to the compartment 2.

The central tube (c) is at its end provided with a valve unit (vu) that in this embodiment is in an open position equipped with defection wings (dw). The valve unit can be fixated or be running in a slow rotating mode. The valve unit is also provided with wings that may enhance horizontal rotating flow and forces when water and pollutions are passing it during the collecting phase to accomplish the (ccF) platform as being described above. The slow horizontal spiral spinning motion results in that the whole area of the compartment 2 can be used to create an even vertical flow towards the outlet through the propeller 8. The spiral spinning motions and the low vertical flow rate that is set by the rotational speed of the propeller is also very suitable when applying a non-clogging coalescent filter (CF) disclosed above in relation to FIG. 4*b*, or as in this embodiment be replaced by a simple and disposable coalescent filter (Cf) made from a polymeric foam-like material.

With references to FIGS. 5*a*-5*c* the separating and collecting compartment 2 is at its upper part connected to a preferably oval outflow tract (ot) that in turn is the connection site for a thin formable oval hose (oh) that further is connected to a floating storage bag (SB). The type of bag that is used is e.g. dependent on the harvested pollutants. In this example, a closed oil proof bag may be used, and thus forms a closed storage loop to the surroundings. In this or other examples a semi liquid proof storage bag may be used that will allow water to penetrate out from the bag, but will keep the pollutants inside, e.g. attached to a suitable absorbent inside the storage bag, and thus form an open loop to the soundings.

During the collecting phase there will be a negative pressure in the compartment 2. Pressure gradients formed by the outside water pressure and the negative pressure inside the compartment 2 during the collecting phase will close the hose like a valve (oh).

In FIG. 5*c* is disclosed a passive transportation of collected pollutants to the collecting storage bag (SB). Once the propeller is turned off the negative pressure in the compartment will cease and the pollutants will, by flotation forces and rotation, enter into the hose and further enter into the storage bag. Once the collecting phase starts again there will be a re-enter of water through the hose into the compartment 2 until a negative pressure is generated due to that discharged pollutant with lower density starts to re-enter into the compartment 2. The pressure gradients together with floating forces in the storage bag construction will than close the oval hose (oh). Larger distances between the water level and the outflow tract (oh) on the compartment (2) will increase the closing forces. A passive transportation of pollutants into the storage bag (SB) as described may enlarge the collecting volume of the compartment 2.

Clogging of the filter unit (fu) in this embodiment with a passive filling into a floating bag cannot easily be handled by a reverse rotation of the propeller with a positive overpressure in the compartment 2, as that would fill the storage bag (SB) with water. However, this may be handled in the following way.

Clogging of the inlet filter unit (fu) will result in a lower inflow to the total compartment 2. That would in turn result in a higher negative pressure inside the casing 1 and consequently as earlier being described result in that the distance between water level 9 and the external water level (wd) will increase that in turn results in that the floater 5 will have a deeper position in relation to the external water level (wd). That will increase the power consumption of the motor unit. The power consumption is measured and if it is higher than a preset level a control unit (not shown) is configured to apply a tailored control procedure for controlling the rotational speed of the motor. In this specific situation, the control unit will generate control signals for controlling the motor to continuously and alternately increase and decrease the rotational speed of the propeller 8. That will generate interfering up and down motions (arr) between the floating forces generated by the total enclosed volume displacement of floater 5 and bellow 4 and the floating forces of the pontoons (p). These interfering forces will by these up and down motions wash away the clogging pollutants on top of the filter unit (fu). When predetermined normal power consumption is detected the varying motor speed is replaced by normal operation.

The embodiments disclosed with references to FIGS. 4 and 5 can, as earlier being described, be adapted with a thin net to handle e.g. leaves and thin plastic sheets according to the centrifugal collecting flow (ccF) platform.

FIG. 6*a*-6*f* illustrate perspective and in some figures also cross-sectional views of the skimming and separation device according to one embodiment of the present invention related to the central rotating vertical and horizontal flow (crvhF) platform and when needed a centrifugal collecting flow (ccF) platform This embodiment is especially useful to separate thin oil-sheen on water surfaces. Another advantageous use is to separate e.g. protein layers floating on the movable water levels in e.g. water towers to avoid that these layers are tapered on to the walls during the up and down motions of the water.

First with reference to FIG. 6*a* the skimming and separation device comprises an upper part (UP), a middle disposable (combustible) separating and collecting part (MP) and a lower drive unit part (DP).

The upper part (UP) is structured to provide for fixation of a bellow 4, and a floater 5. It may further be the fixating part for a floater construction (FC). The floater is preferably further provided with an upper first ruff filter (fu) to prevent that larger solid particles do not enter into the progressive cleaning process of the device.

Figure 6B:
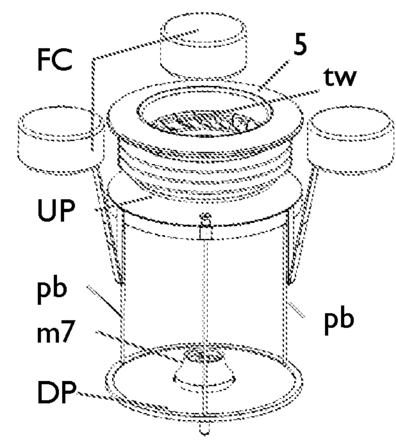

In FIG. 6*b* the device is shown where the disposable middle part (MP) has been removed. The drive unit part (DP) with the motor unit (m7) is clearly visible, and may easily be fitted into the disposable middle part (MP) with its cone-shaped form. The upper part (UP) and the drive unit part (DP) are fixated to each other and to the middle part (MP) e.g. by pin bolts (pb) to accomplish the complete assembled cleaning device.

Figure 6C:
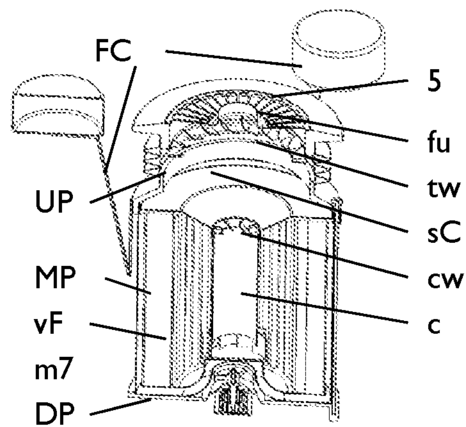

FIG. 6*c* is a cross-sectional view that discloses that the upper part (UP) in contact with the middle part (MP) defines a concentrating skimming compartment (sC) having the corresponding function as the one described in relation to FIGS. 4 and 5.

A central rotation member is provided and arranged in relation to the floater 5. Preferably the rotation member has a circular shape in a horizontal plane and being arranged along the inner periphery of the floater 5. The rotation member is e.g. provided with tilted wings (tw) to generate spinning motions in the skimming and concentrating compartment (sC). The floater 5 may also be equipped with the ruff filter (fu) to prevent that larger solid pollutants, like e.g. seaweeds, enter into the compartment when the device is used e.g. for oil recovery on sea beds. In that case, the spiral filter (sf) shown in FIG. 6*d* may be dispensed with. The central vertical tube (c) with the tilted wings (cw) is preferably a part of the disposable middle part (MP) which will be further described with references to FIGS. 7*a-d*.

Figure 6D:
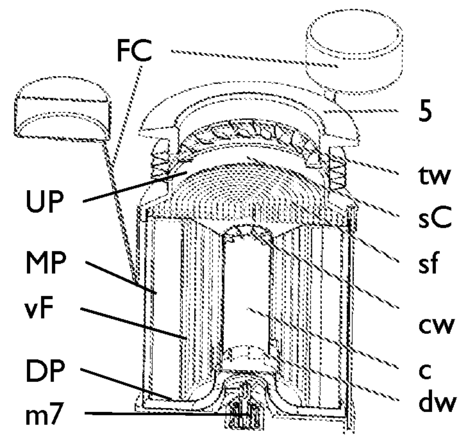

FIG. 6*d* is a cross-sectional view disclosing that that the upper part (UP) in contact with the middle part (MP) defines the concentrating skimming compartment (sC). The floater 5 is provided with the central rotation member, here embodied with tilted wings (tw) to generate rotating motions in the liquid flow into the skimming and concentrating compartment (sC). A spiral ruff filter (sf) is provided which in this embodiment being arranged in the compartment (sC). The spiral ruff filter (sf) is structured to collect larger pollutants in order to prevent them from entering into central vertical tube (c), e.g. when the device is used in water towers to collect e.g. floating protein layers.

Figure 6E:
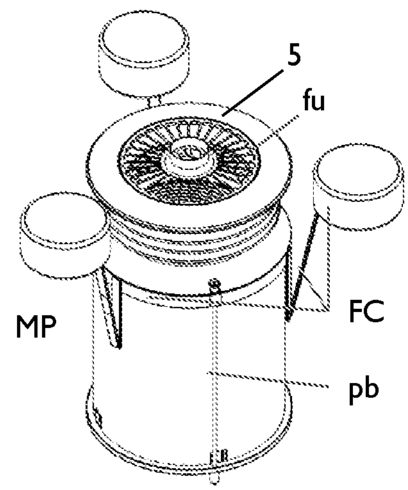

FIG. 6*e* shows the device placed on a water level to be used for oil recovery. It is equipped with an upper first ruff filter (fu) to prevent that larger solid particles like seaweeds etc. enter into the progressive separation compartment. By applying the control procedure discussed in relation to FIG. 5, the rotational speed of the motor may be alternately increased and decreased in order to automatically remove solid debris that might clog the filter (fu).

Figure 6F:
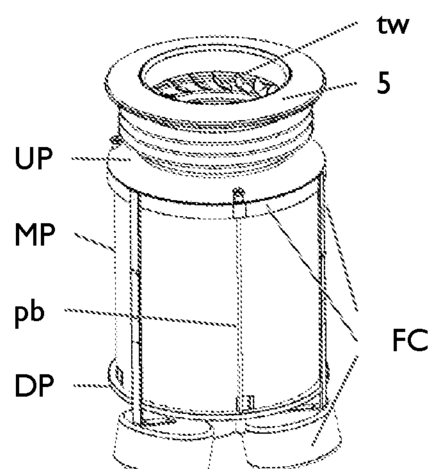

FIG. 6*f* shows a perspective view of the device without a ruff filter (fu). A floater construction (FC) including floating elements is provided and attached to the separation and skimming device. In some application, e.g. when the device is to be used in a water tower it is necessary to adapt the maximal diameter of the device to a manhole opening to have access to the water. The floating construction is then provided with foldable supporting rods connected to the floating elements. Thereby the floating elements may be positioned such that the overall diameter of the device is minimized.

FIGS. 7*a*-7*d* shows various views of the disposable middle part (MP) of the skimming and separation device discussed in relation to FIGS. 6*a*-6*f*.

Figure 7A:
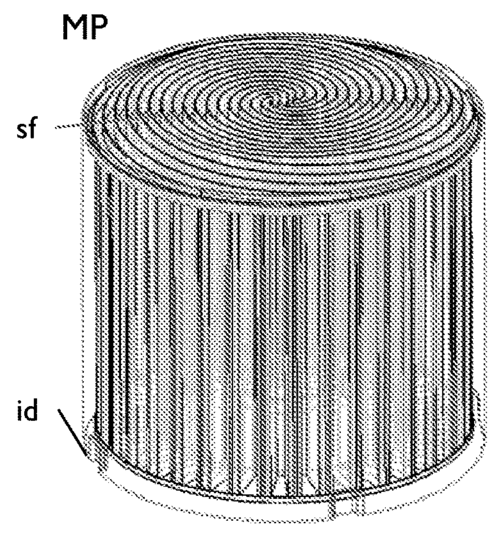
FIGS. 7a-7d illustrates various views of the middle part of the skimming and separation device illustrated in FIGS. 6a-6f.

FIG. 7*a* is a perspective view to the disposable middle part (MP). In this variation, the middle part is provided a spiral ruff filter (sf) to prevent larger solid particles, like floating solids in water towers, from entering into the central tube (c). The disposable middle part (MP) is provided with a number of indentations (id), e.g. four, arranged along a periphery of the lower part of the middle part. The indentations are structured to create a valve function of the filter unit which will be further discussed in the following.

Figure 7B:
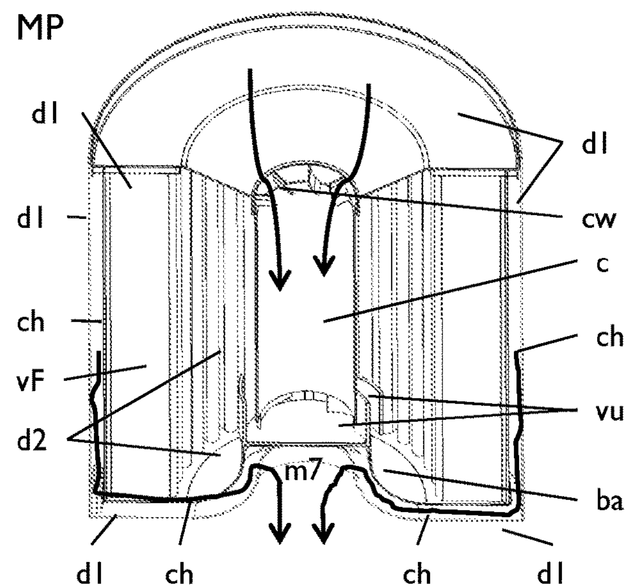

FIG. 7*b* is a cross-sectional perspective view of the middle part (MP). The middle part (MP) has the shape of a cylinder having a circular cross-section and comprises a disposable casing (d1) made from a thin outer enclosure, that preferably is transparent. A separating and collecting compartment (d2) is defined being involved in the progressive cleaning process performed by the device. A central vertical tube (c) is provided along a longitudinal axis of the middle part. In the upper part of the tube a central rotation member may be arranged, in this embodiment in the shape of tilted wings (cw). It further comprises a valve unit (vu) (which is described in detail in relation to FIG. 4*a*) that in this embodiment is attached to a bottom arrangement (ba) of a vertical oriented filter unit (vF). The filter unit (vF) has an overall hollow circular cylindrical shape where the central vertical tube (c) is arranged along the longitudinal axis of the filter unit and the separation and collecting compartment (d2) is defined in the space between the inner surface of the filter unit and the outer surface of the central tube. Preferably, the filter unit comprises a vertically oriented and pleated filter. The filter unit is capable to let through the carrying fluid, which usually is water and in case of coalescent filters also the pollutants e.g. oil.

The valve unit (vu) may also be provided with wings that will force passing water and pollutions entering into the separation and collecting compartment (d2) to continue into slow rotating motions. In this embodiment, these motions are headed to a very large peripheral area of the vertically oriented pleated filter/filters (vF), and/or the polymeric disposable coalescent filters, when oil is the pollutant.

There is a distance between the inner surface of the casing (d1) and the outer surface of the filter unit defining circumferential vertical collecting canals (ch) that continue as channels beneath the floating filter unit and its bottom arrangement (ba) to the motor output area (m7), see the arrows in FIG. 7*b*. The velocity through the filters will be very low due to the peripheral arrangement. If the diameter of the filter is increased and/or the vertical length of the filter is increased that will impact the velocity through the filter that will decrease. The current through the motor unit may be measured in order to serve as an indicator to indicate when the resistance through filters is too high and generate signals for replacing the filters and/or stop the collecting or start a cleaning process of the ruff filter (fu) being attached to the floater 5 as being described in relation to FIG. 5*b*.

Figure 7C:
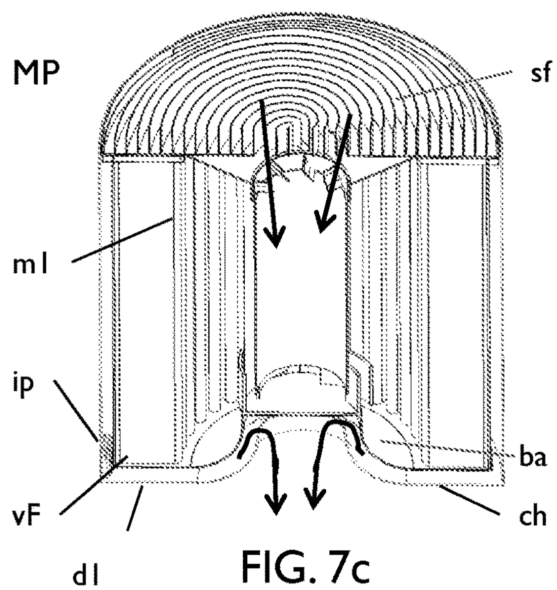
Figure 7D:
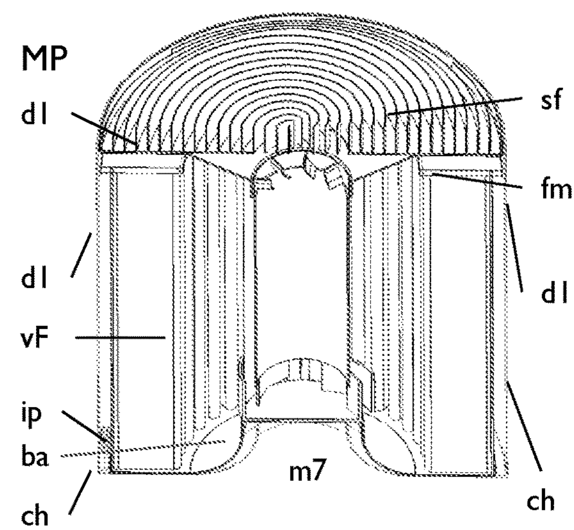

In FIGS. 7*c* and 7*d* is specifically illustrated the capabilities of the vertical floating filter arrangement (vF) in the separation and collecting compartment (d2) of being a part of a valve function in relation to the disposable casing (d1). When the filter starts to be full of pollutants and when the whole skimming and separation device is lifted out of the water, measures are provided to prevent that collected pollutants will leak out through the outflow tract of the motor unit (m7).

In FIG. 7*c* is shown that the vertical filter unit (vF) is arranged in a floating condition inside the casing (d1). The water, or a mixture of water and pollutants, has a higher density than the total density of the vertical filter arrangement (vF). That will lead to that the filter unit will float and hit the upper part of the disposable container (d1) and flow of cleaned water may pass through the peripheral flow channels (ch) and follow the horizontal channels out through the motor output area (m7).

The floating forces of the vertical movable filter unit (vF) is further illustrated in FIG. 7*d*. Those floating forces of the vertical movable filter unit (vF) may be adjusted with floating means (fm) and the bottom arrangement (ba) is applied as a valve function to block flow of water and/or pollutants from the peripheral flow canals (ch) to the outflow tract (m7). That may occur when a mixture of water and pollutants have a lower density than the total density of the vertical filter arrangement (vF). It may also occur when air through air vents at the junction to the upper part (UP) (not shown) enters into the disposable container (d1) when the cleaning device is being lifted out of the water and the filter unit will be replaced.

The whole filter unit with its collected pollutants may then be handled in suitable ways.

In this embodiment described with references to FIGS. 6 and 7, provided with peripheral flow canals the final purification steps are done by vertical oriented pleated filters and/or coalition filters arranged inside the casing (d1). The device provided with vertical flow channels and filters may of course be scaled up for a non-disposable system with different emptying processes being described in the present application.

Furthermore, this embodiment enables to create optimized conditions for effective gravimetric and centrifugal purification and accumulation of pollutants, with or without filtrations, in order to accomplish a long-term collection of very thin layers of pollutants like oil, floating proteins and algae but sparingly of solids, floating on water.

In all the above embodiments, the propeller 8 of the motor may be of a cutting type to avoid debris to wind up around the propeller. The above mentioned embodiments may also be used for building larger units and platforms for e.g. offshore use, lake and river cleaning where e.g. electric generators, steam generators, weed cutting equipment, screw pumps etc. may be applied to improve transportations of pollutants to a suitable storage unit.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A skimming and separation device comprising an outer casing provided with constructions to directly or indirectly fasten all parts, defining a compartment, a floater configured to create a skimming function of the device, the floater being attached at its lower side to an essentially vertically arranged bellow allowing the floater to adapt flow into a substantially circum volume and allowing the floater to move from an upper position with essentially no flow into the compartment to a lower position allowing flow of water and debris for following the contours of the floater in a downward direction into the device, a power device with a propeller, wherein said power device is configured to be controlled by a control unit such that various kinds of flows and pressures may be generated to control the in-flow and outflow of the device, and a central tube arranged along a vertical center axis of the compartment and configured to receive said flow of water and debris, and at least one central rotation member being structured to generate a downward directed and central rotating flow of said water and debris within said central tube, and wherein said at least one central rotation member includes deflecting members provided within said vertical central tube.

2. The skimming and separating device according to claim 1, wherein said at least one central rotation member comprises deflecting members arranged below and along the inner periphery of said floater.

3. The skimming and separating device according to claim 1, wherein said deflecting members include tilted wings provided within said vertical central tube.

4. The skimming and separating device according to claim 1, wherein the central tube is at the lower end provided with a valve unit, that is configured to perform its valve function to close the central tube during an ejection phase of the device.

5. The skimming and separating device according to claim 4, wherein the valve unit is provided with deflecting members that will direct passing water and debris entering into the compartment to continue a rotating motion, during a collecting phase of the device.

6. The skimming and separating device according to claim 1, wherein the device comprises an essentially planar and disc-shaped coalescent filter that is arranged in a horizontal plane in the lower part of the compartment.

7. The skimming and separating device according to claim 1, wherein the device comprises an upper part, a middle separating and collecting part and a lower drive unit part, wherein these parts are structured to be assembled such that the device has an essentially circular cylindrical shape, wherein the upper part is structured to provide for fixation of said bellow, and said floater, and wherein the middle part has the shape of a cylinder having a circular cross-section and comprises said vertical central tube and an outer enclosure defining a separating and collecting compartment and that a vertically oriented filter unit is arranged within said compartment.

8. The skimming and separating device according to claim 7, wherein the filter unit has an overall hollow circular cylindrical shape where the central vertical tube is arranged within and along a longitudinal axis of the filter unit.

9. The skimming and separating device according to claim 8, wherein a distance is provided between the inner surface of the casing and the outer surface of the filter unit defining circumferential vertical collecting canals that continue as channels beneath the filter unit and its bottom arrangement to a motor output area.

10. The skimming and separating device according to claim 8, wherein the filter unit is a vertically arranged pleated filter and/or a coalescent filter.

11. The skimming and separating device according to claim 1, wherein said control unit is configured to receive a measurement signal from the power device indicating the power consumption of the power device, and if the power consumption is above a predetermined threshold, the control unit is configured to vary the rotational speed of the propeller and/or alter the rotational direction according to preset control rules.

12. The skimming and separating device according to claim 11, wherein said rules comprise a rule including control instructions to continuously and repetitively increase and then decrease the rotational speed and to alter the rotational direction.

13. The skimming and separating device according to claim 1, wherein the skimming and separating device comprises at least one maneuvering fan mounted at the device such that the device may be turned around its central vertical axis, and wherein said control unit is configured to receive positioning data, and to control said at least one maneuvering fan in dependence of said positioning data.

* * * * *